United States Patent

[11] 3,634,767

| [72] | Inventor | Robert S. Roeder<br>Dunedin, Fla. |
|---|---|---|
| [21] | Appl. No. | 18,973 |
| [22] | Filed | Mar. 12, 1970 |
| [45] | Patented | Jan. 11, 1972 |
| [73] | Assignee | Sperry Rand Corporation |

[54] RADIOMETER DETECTOR CIRCUIT
4 Claims, 8 Drawing Figs.

[52] U.S. Cl.................................................. 325/363,
321/15, 329/166, 329/204
[51] Int. Cl.................................................... H03d 1/10
[50] Field of Search.......................................... 320/1;
321/15; 307/317, 319; 328/145; 325/67, 363, 487,
449, 451; 329/166, 189, 203, 204

[56] References Cited
UNITED STATES PATENTS

| 3,167,714 | 1/1965 | Seling............................ | 325/363 |
| 2,673,294 | 3/1954 | Battell et al................... | 329/204 X |
| 3,140,444 | 7/1964 | Carlson.......................... | 325/451 X |
| 3,171,897 | 3/1965 | Wlasuk.......................... | 325/363 X |
| 3,355,639 | 11/1967 | Semenhuk..................... | 321/15 X |

OTHER REFERENCES
Semiconductor Devices; Turner, Rufus P.; Holt, Rinehart and Winston, Inc.; New York, N.Y., 1965; page 51 relied on.

*Primary Examiner*—Benedict V. Safourek
*Attorney*—S. C. Yeaton

ABSTRACT: A detector circuit for efficiently demodulating carrier signals having imposed upon them amplitude modulation data representing the radiometric difference in effective temperature between an unknown source of very high frequency signals and a standard reference is disclosed.

INVENTOR
ROBERT S. ROEDER
BY
*HP Terry*
ATTORNEY 3,634,767

RADIOMETER DETECTOR CIRCUIT

BACKGROUND OF THE INVENTION

1. Field of the Invention

The invention is an improved signal detector circuit for application in high-frequency radiometer systems and more particularly is an improved amplitude modulation detector having a matched, very broad band input configuration cooperating with an efficient dual-diode circuit of enhanced voltage sensitivity arranged for parallel detection operation in a series biasing circuit.

2. Description of the Prior Art

High-frequency radiometer systems have particular characteristics that determine special design requirements for detector circuits used to lift the radiometer switching or chopping frequency data from the intermediate frequency carrier so that subsequent phase sensitive amplitude detection may then yield accurate radiometric temperature measurements. In radiometer systems, the intermediate frequency bandwidth of the detector input must be very great in order to achieve high temperature sensitivity, whereas the useful bandwidth at the output of the detector is very narrow. The radiometer receiver information rate is relatively low and only a narrow band of signals of frequency centered on the radiometer chopping or switching frequency is desired. Typical intermediate frequency bandwidths range from less than 50 MHz to over 1 GHz, while the detector output bandwidths range from a few cycles per second to several hundred cycles per second, generally centered at a relatively low audiofrequency.

Major difficulties in achieving high detection efficiency and distortion-free operation of prior art radiometer detector or demodulator circuits have centered about problems of approaching adequate matching of the output of the intermediate frequency stages to available diode detectors, particularly when very high input intermediate frequency bandwidths are required.

Difficulties with prior art radiometer detector circuits have arisen because of attempts to use simple resistive components in place of inductive elements in a compromise attempt to attain reasonably good matching between the intermediate frequency amplifier and the detector input circuit. However, such circuits have not generally proved satisfactory. The detector voltage sensitivity is seriously degraded because a major portion of the input intermediate frequency power is lost in the resistor element, rather than being effectively used by the diode detector.

SUMMARY OF THE INVENTION

The invention is a signal amplitude modulation detector or demodulator circuit especially adapted for deriving information from such modulations representative of the radiometric difference in temperature between the effective temperature of an unknown source of high-frequency or microwave signals and a standard reference high-frequency or microwave source. The novel detector or demodulator circuit efficiently lifts the radiometer switching cycle frequency envelope from an intermediate frequency carrier signal so that subsequent phase sensitive detection of the signal with reference to the switching phase may generate accurate temperature comparison data over an extended range of input signal levels.

DESCRIPTION OF THE PREFERRED EMBODIMENT

Figure 1:
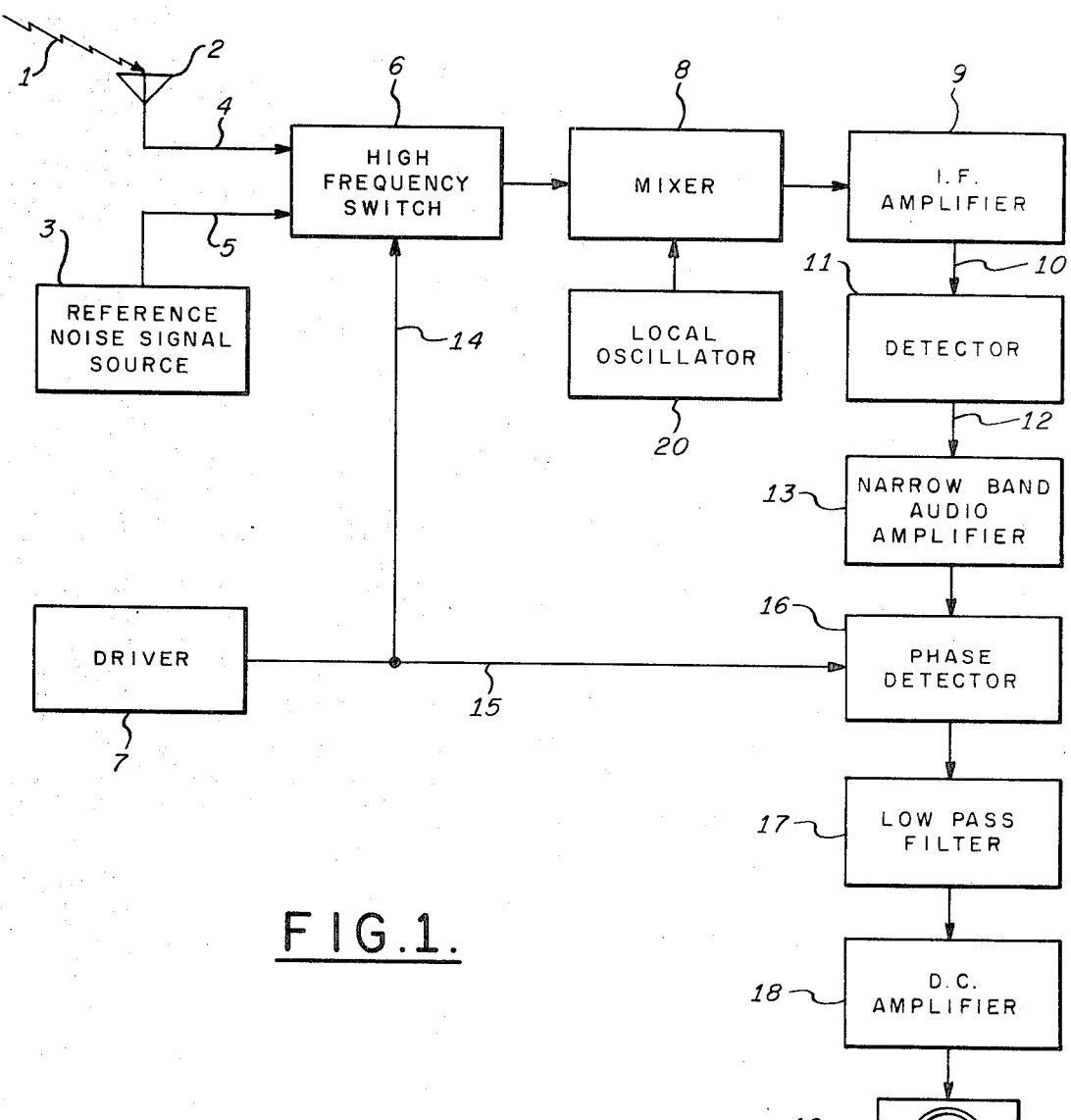
FIGS. 1 is a block diagram of a radiometer receiver system for employment of the detector circuit of the present invention.

In FIG. 1, there is shown a block diagram of a radiometer system for employment of the invention. While shown in block diagram form, it will be seen that the illustrative radiometer system is useful over a wide spectrum of radiofrequencies, and that it is of particular merit for use in the high-frequency or microwave bands. It will be understood that the invention is useful in the type of radiometer known in the art as the comparison type of radiometer or in the less commonly used total-power radiometer. In comparison radiometers, the radiometer receiver is cyclically switched from a receiving antenna to a reference noise signal source.

The invention will be discussed herein in connection with a known type of comparison radiometer receiver in which an electronically actuated microwave switch first connects incoming signals collected by an antenna to a radio receiver, and then connects instead a temperature-controlled microwave noise source to the receiver. Cyclic repetition of this switching process is conventionally employed in certain prior art radiometer concepts. The invention is also equally applicable in the microwave type of comparison radiometer in which a noise reference element of known temperature is physically cyclically injected into and withdrawn from the transmission line joining the receiving antenna to the radiometer receiver.

In FIG. 1, signals 1 such as, for instance, low-power, noiselike radiofrequency signals commonly associated with thermal radiation, generated by any source to be examined by the radiometer, are received by an antenna 2 which may be any of various known types of broadband microwave or other antennas previously used in the radiometer art. The antenna accepts all signals falling within its passband and supplies them to an input 4 of a high-frequency switching or chopping device 6. An opposite pole or input 5 of the switching device 6 is supplied with the output of a reference noise signal source 3. Noise source 3 may be either a temperature controlled waveguide load or a conventional gas tube or semiconductor noise source. It is normally set to operate at approximately the temperature level of the background noise seen by antenna 2.

The switching device 6 may be a known low-noise microwave switch or chopper, as it functions cyclically and alternately to connect antenna 2 or the reference noise signal source 3 to the remaining elements of the radiometer receiver. Switch 6 may be a conventional ferrimagnetic or other microwave switch whose state is cyclically changed by driver 7. Switch 6 may, for instance, be a known type of latching ferrite switch.

The output transmission line of switch 6 supplies the cyclically varying signal propagating within it to a conventional microwave mixer 8. A local oscillator 20 supplying high-frequency signals in the usual manner to mixer 8 causes mixing of the two input signals, and the generation of a modulated difference-frequency signal in the intermediate frequency spectrum for application to broadband intermediate frequency amplifier 9.

The amplified output of intermediate frequency amplifier 9, when there is a difference in the levels of signals input at ports 4 and 5, is an amplitude-modulated signal, the modulation frequency being the switching repetition rate of switch 6. The novel envelope detector 11 is used to remove this audio modulation, which may be of a frequency on the order of 30 to 1,000 cycles per second, from the intermediate frequency envelope, and to pass it through tuned or narrow band audio amplifier 13. Amplifier 13 has the center of its passband coincident with the switching frequency of switch 6.

In order to compare the phase and amplitude of the signals on ports 4 and 5, a sinusoidal output of driver circuit 7 that is in phase with the operation of switch 6 is supplied as a phase reference signal to one input of phase sensitive detector 16. The output of audio amplifier 13 comprises a second input to phase sensitive detector 16, a device employed in a conventional manner to detect the relative amplitude of input signals and to evaluate which input signal is the greater.

As in conventional practice, the output of phase sensitive detector 16 is a polarity-reversing direct voltage, which signal is subjected to the action of a low-pass filter or integrator 17, is amplified by DC amplifier 18, and is finally displayed, for instance, by a zero-center direct current meter 19. The adjustment of driver 7 and the phase of the reference signal generated by it relative to operation of switch 6 is such that, when signal 1 is equal in amplitude to the reference noise signal from source 3, the meter needle points to zero, for instance, on the scale of meter 19. When signal 1 differs in amplitude with respect to the reference noise signal from source 3, the needle is directed proportionally to one side or to the other of the zero indication of meter 19, for example.

Figure 2:
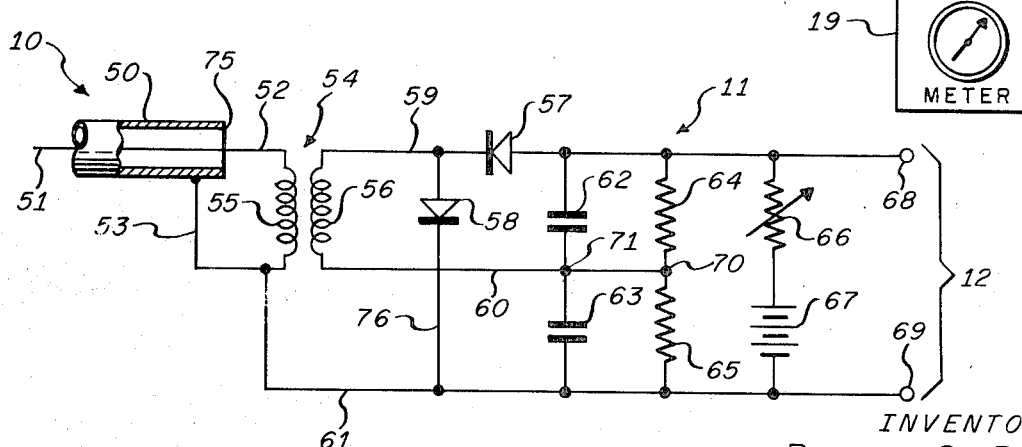
FIG. 2 is a circuit diagram of the novel radiometer detector circuit.

FIG. 2 shows the construction of the novel high sensitivity radiometer detector circuit 11 of FIG. 1; as in FIG. 1, detector 11 is coupled into the radiometer system via an input transmission line 10 supplying thereto modulated carrier signals in the intermediate frequency range from the intermediate frequency amplifier 9. The output of detector circuit 11 is coupled via output circuit path 12 to narrow band audio amplifier 13. As previously noted, the function of radiometer detector circuit 11 is to accept amplitude-modulated intermediate frequency signals, where the modulation frequency is the audiofrequency rate of operation or chopping of switch 6; furthermore, its function is to remove the audio modulation from the intermediate frequency envelope, and to pass it through the narrow band audio amplifier 13.

In FIG. 2, the transmission line 10 supplying energy to detector circuit 11 is a coaxial cable having an inner conductor 51 and an outer or hollow coaxially arranged conductor 50. Input transformer 54 is a wide band, air core, step-up transformer having input leads 52 and 53, respectively connected to inner conductor 51 and outer conductor 50 of coaxial transmission line 10. If, for example, coaxial line 10 is selected to have a characteristic impedance of about 50 ohms in the intermediate frequency band of interest, the input winding 55 of transformer 54 is designed to have a matching 50-ohm impedance. The transformer 54 may be enclosed in a shielding brass case, as in conventional practice, tightly closed against interfering signals by a brass lid soldered to the transformer case. Coaxial line 10 is arranged to pass through a wall of the case and to be wired directly to the transformer input winding 55; the lengths of center conductor 51 and of the extension 53 of the outer conductor 50 are kept very short after the point 75 of their separation.

Input transformer 54 has a voltage step-up output winding 56, whose characteristic impedance in the intermediate frequency band is about 200 ohms, for example, as will be seen, such an impedance characteristic is selected because it is compatible with the characteristics of elements of the detector circuit yet to be described.

Output winding 56 of transformer 54 is coupled at its end to circuit leads 59 and 60; lead 60 becomes the central lead in a balanced circuit employing lead 59 and lead 61 coupled to the side of input winding 55 connected (53) to the outer conductor 50 of coaxial line 10. At junction 71, lead 60 is centrally connected between filter capacitors 62 and 63. The outer terminals of filter capacitors 62 and 63 are respectively connected to leads 59 and 61.

A first diode detector 58 is placed in lead 76, while a second diode detector 57 is placed in lead 59 between capacitor 62 and the first diode 58. A resistive shunt path with respect to filter capacitors 62 and 63 is formed between leads 59 and 61 by series or load resistors 64 and 65 whose common junction 70 is connected to terminal 71 between condensers 62 and 63 and therefore to lead 60. A final shunt circuit path appears between leads 59 and 61 in the form of a bias battery 67 or other bias current source and an adjustable resistance 66 in series with battery 67 adjacent audio output terminals 68 and 69 (output circuit path 12 in FIG. 1).

Diodes 57 and 58 may be any of several types, including diodes packaged for use in relatively high-frequency circuits. While tunnel diodes, barrier diodes, various point contact diodes, or other nonlinear elements may be employed, a point contact diode such as the commercially available 1N830A diode is also found to be satisfactory. Such diodes are subminiature glass-encapsulated devices with standard wire leads.

In constructing the novel detector circuit, diodes 57 and 58, filter capacitors 62 and 63, and resistors 64 and 65 are all wired with the shortest possible leads, being then supported by their leads directly above and by the output connections of transformer 54 so as to minimize impedance discontinuities. The intermediate frequency impedances of diodes 57 and 58 are typically 300 to 400 ohms but, as seen from FIG. 2, they represent a parallel circuit to the intermediate frequencies flowing from transformer winding 56 and consequently present a greatly improved impedance match relative to winding 56. Other circuit components in FIG. 2 may have values such as the following: capacitors 62 and 63 may be 1,000 picofarads each, resistors 64 and 65 may be 27,000 ohms each, variable resistors 66 may be 1 megohm maximum, and battery or direct current bias circuit 67 may supply 1.35 volts.

The bias circuit, including voltage source 67 and variable resistor 66, plays a significant role in the improved sensitivity of operation of the novel radiometer detector circuit. The bias current from source 67 passes through the resistor 66 and then in the forward conduction direction successively through diodes 57 and 58 in series and back via lead 61 to source 67. The same current must therefore pass through both of the diodes 57 and 58, and it is clear that matched diodes of the novel detector circuit must therefore operate with the same sensitivity and demonstrate the same detection efficiency. Thus, balanced and distortion-free detection of the audio modulation is also assured. While the excess noise even of selected diode detectors may be significant at low audiofrequencies, the narrow passband of the tuned amplifier 13 following detector 11 prevents such diode excess noise from representing a serious problem.

Figure 3A:
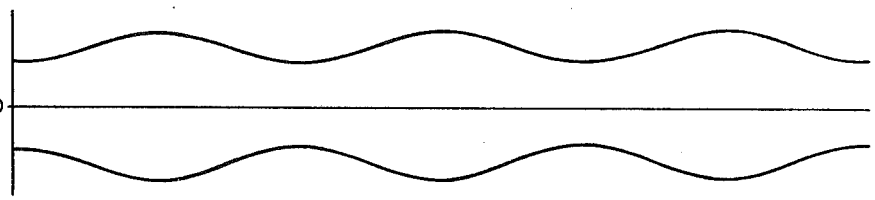
FIGS. 3a, 3b, 3c, and 3d are graphs illustrating waveforms at particular locations in the circuit of FIG. 2.
Figure 3B:
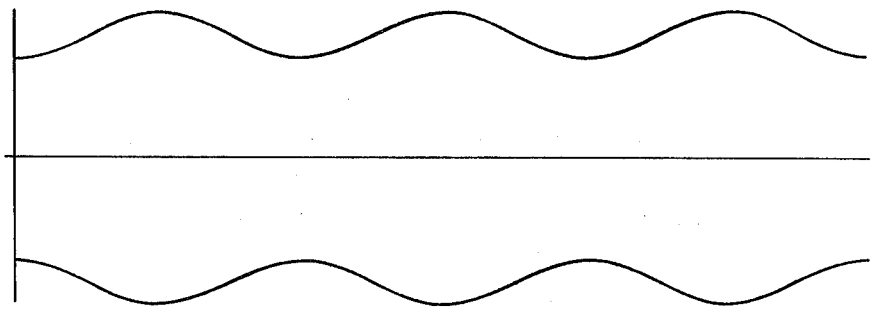
Figure 3C:
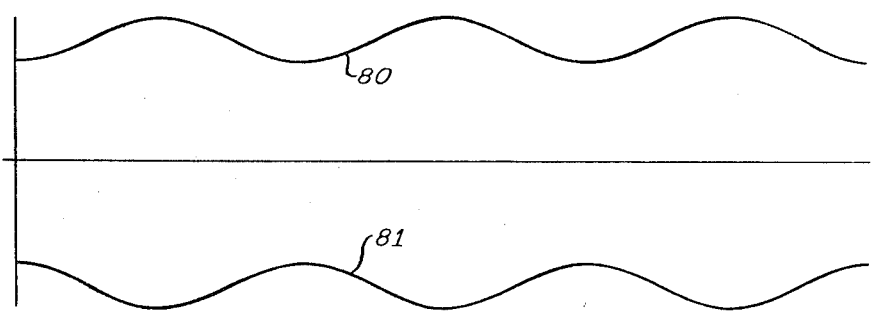

Operation of the novel radiometer detector circuit is apparent from the foregoing discussion, and may also be understood with reference to FIGS. 3a, 3b, 3c and 3d, which illustrates waveforms at a various circuit junctions in FIG. 2. For example, FIG. 3a is typical of the envelope of the audio modulated intermediate frequency noise waveform output from intermediate frequency amplifier 9 and found on leads 52 and 53 of transformer (54) in put winding. The output of transformer 54, found on the transformer output winding (56) terminals connected to leads 59 and 60, is a noise signal within the envelope of FIG. 3b.

Figure 3D:
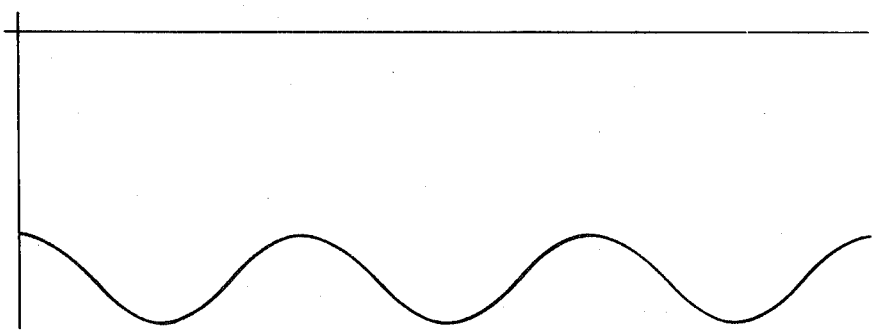

Diode 57 conducts on the negative half-cycles of the intermediate frequency signal on lead 59 and the current flowing during the conduction period is stored as a voltage across condenser 62. On the positive half-cycles of the intermediate frequency signal on lead 59, the current flowing during the conduction period of diode 58 is stored as a voltage across condenser 63. The voltages across condensers 62 and 63 add, and the smoothed audio signal output appearing respectively across resistors 64 and 65 have the character shown in FIG. 3c, where wave 80 is the signal appearing between terminals 69 and 70, and wave 81 appears between terminals 68 and 70. FIG. 3d shows the final negative going detected audio signal found between output terminals 68 and 69.

It is seen that the novel radiometer circuit for detecting an audio signal imposed on an intermediate frequency carrier signal in accordance with the radiometer switching or chopping rate provides enhanced voltage sensitivity. Demonstrated improvement over prior art circuits for performing the radiometer detection function is by a ratio greater than 10 to one. This increase in voltage sensitivity is achieved through the use of an improved, matched circuit configuration employing a pair of diodes arranged for parallel detection, series voltage-adding operation upon incoming signals, forward biased in series relation for increased detection sensitivity.

The circuit configuration permits biasing of both diodes at the same level, so that like response of both diodes is a beneficial and inherent result.

A consequence of the higher voltage sensitivity is that the gain required in narrow band audio amplifier 13 and DC amplifier 18 is reduced, thus minimizing active circuit gain in adverse operating circumstances. The use of transformer input coupling to the detector circuit conveniently provides for isolation of direct current flow in signal and return circuit paths, if desired. The low-frequency noise signals coupled into the radiometer channel at the front end of the system may be effectively blocked by transformer 54, such as electrical noise signals generated by driver 7 which would be of the same frequency as the center frequency of audio amplifier 13. It has also been demonstrated that the equivalent noise temperature of the novel detector circuit is less than in prior art radiometer circuits.

Figure 4:
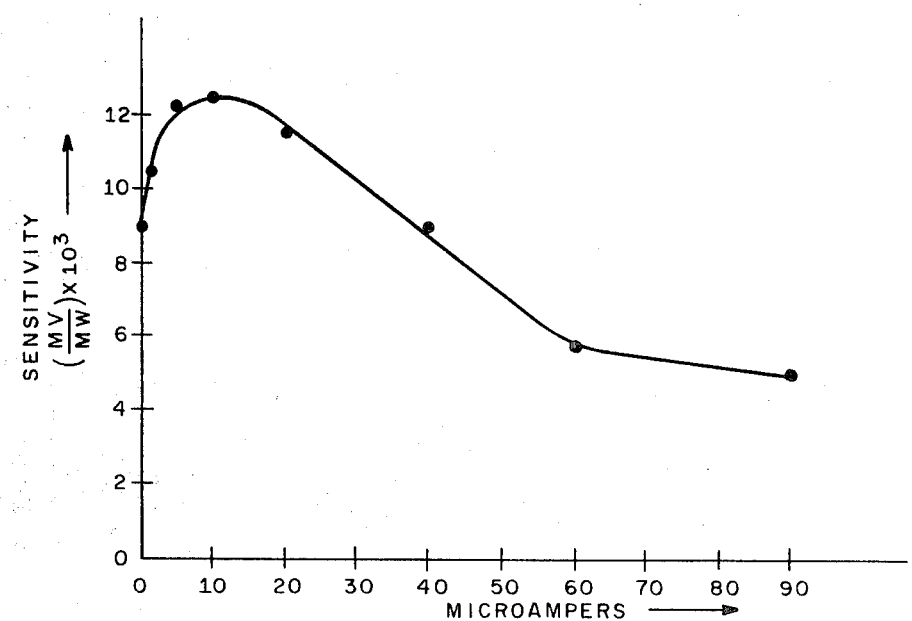
FIGS. 4 and 5 are graphs illustrating performance characteristics of the circuit of FIG. 2.
Figure 5:
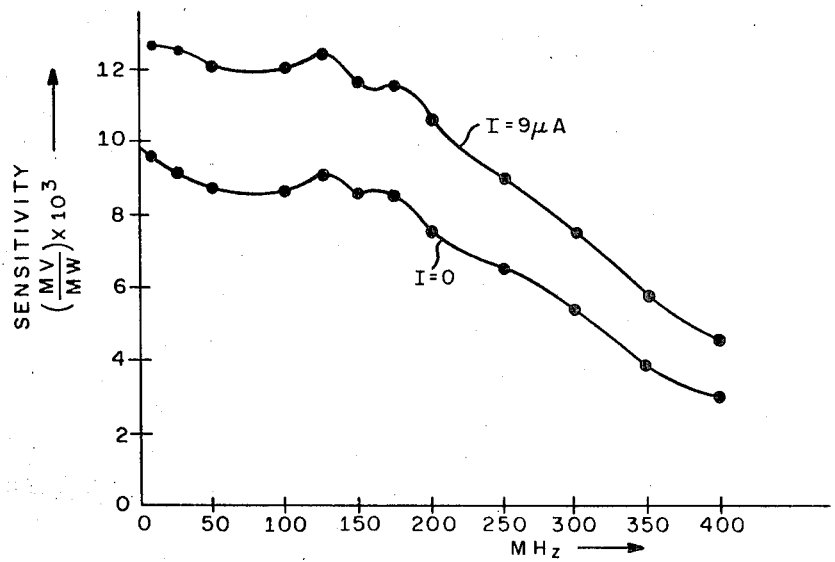

FIG. 4 illustrates typical performance data of the novel radiometer detector circuit in which voltage sensitivity is plotted against diode bias current for a typical input signal at 50 MHz. In FIG. 5, voltage sensitivity of the novel detector circuit is plotted versus input carrier frequency for respective diode bias levels of 0 and 9 microamperes with constant input power. The curve for the 9 microampere bias situation demonstrates a voltage sensitivity well in excess of 10,000 millivolts per milliwatt, a significant increase over the 700 to 1,000 millivolt per milliwatt sensitivity characteristic of commercially available radiometer detector circuits.

While the invention has been described in its preferred embodiments, it is to be understood that the words which have been used are words of description rather than of limitation and that changes within the purview of the appended claims may be made without departure from the true scope and spirit of the invention in its broader aspects.

I claim:

1. A switching-modulation detector circuit, adapted for receiving amplitude-modulation signals generated in a switching comparison high-frequency radiometer system, comprising:

transformer means having first and second coupled windings,
input means connected across said first winding,
first, second, and third conductor means,
said first and second conductor means being connected to said second winding,
said third conductor means being connected to said first winding,
said first and third conductor means being adapted to serve as output means,
first and second diode means,
said first diode means being serially connected within said first conductor means,
said second diode means being connected to said first conductor means between said first diode means and said second winding and to said third conductor means,
first and second capacitor means,
said first capacitor means being connected to said first conductor means on the side of said first diode means remote from said second winding and to said second conductor means,
said second capacitor means being connected to said second and third conductor means adjacent said first capacitor means,
first and second resistor means respectively connected in shunt across said first and second capacitor means, and
adjustable unidirectional bias current source means connected to said first and third conductor means,
said first and second diode means being so poled and so coupled to said condenser means and said resistor means as to remove said amplitude modulation signal from said amplitude-modulated signal for supply to said output means,
said bias source means being so cooperatively arranged and connected as to supply bias current in series relation through a said first and second diode means for improving the efficiency of operation thereof.

2. Apparatus as described in claim 1 wherein said input means comprises first and second coaxially arranged conductors.

3. Apparatus as described in claim 2 wherein said transformer means comprises a voltage step-up transformer for improving the impedance match between said input means and said diode means.

4. Apparatus as described in claim 3 wherein said diode means comprise point contact semiconductor diodes.

* * * * *